Sept. 11, 1951 G. STROMER 2,567,583
FRESH FLOWER HOLDER
Filed May 10, 1949

INVENTOR.
George Stromer
BY Victor J. Evans & Co.
ATTORNEYS

Patented Sept. 11, 1951

2,567,583

UNITED STATES PATENT OFFICE 2,567,583

FRESH FLOWER HOLDER

George Stromer, New Buffalo, Mich.

Application May 10, 1949, Serial No. 92,459

1 Claim. (Cl. 132—46)

This invention relates to a holder for fresh flowers.

The object of the invention is to provide a device for holding a fresh flower whereby the flower will stay fresh for a long period of time.

Another object of the invention is to provide a flower holding cup which is adapted to be attached to a hat or article of clothing and wherein the cup is provided with a moisture holding sponge for supplying the flower with water so that the flower will remain fresh.

A further object of the invention is to provide a fresh flower holder which is extremely simple and inexpensive to manufacture.

Other objects and advantages will become apparent during the course of the following description.

In the accompanying drawings, forming a part of this application, and in which like numerals are used to designate like parts throughout the same:

Figure 1:
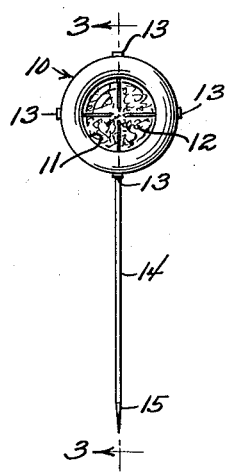
Figure 1 is a front elevational view of the flower holder, according to the present invention.

Referring in detail to the drawings, the numeral 10 designates a cup which may be fabricated of any suitable material, there being a rolled edge 11 arranged on the cup 10 for a purpose to be later described. Arranged in the cup 10 is a lining 12 made of sponge for holding moisture therein. The sponge lining 12 serves to supply water to the fresh flower F so that the flower will remain fresh for a long period of time.

The water from the sponge lining 12 passes into the base B of the flower F, the base B being arranged in contact with the lining. For maintaining the flower immobile in the cup 10, a plurality of headed pins 13 slidably project through the cup 10, through the rolled edge 11 and the pins 13 are adapted to pierce the base of the flower F. The inner ends of the pins 13 may be enlarged slightly to prevent the pins 13 from accidentally working out of the base of the flower and coming loose from the cup 10.

Figure 2:
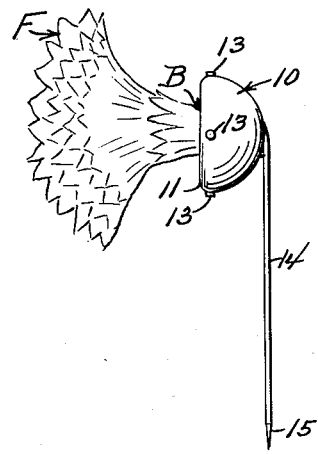
Figure 2 is a side elevational view of the flower holder.
Figure 3:
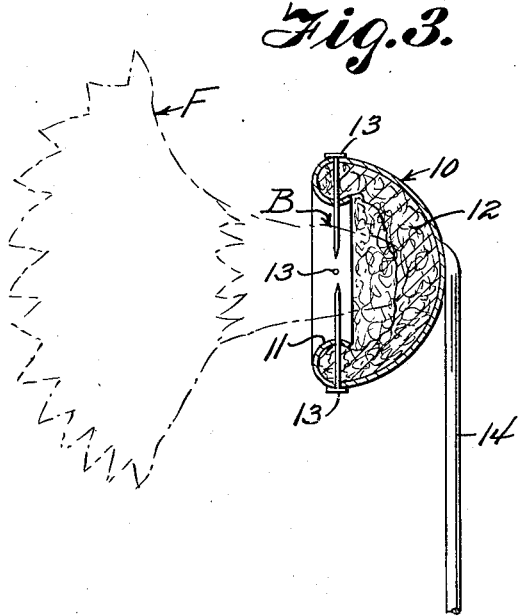
Figure 3 is an enlarged sectional view taken on the line 3—3 of Figure 1.
Figure 4:
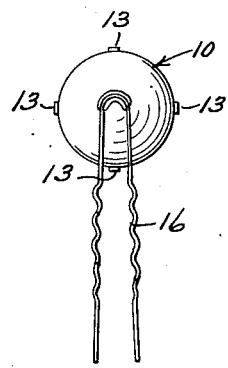
Figure 4 is a rear elevational view of a modified flower holder.

For attaching the flower holder to a hat or to an article of wearing apparel, an elongated pin 14 is secured, as by welding, to the rear of the cup 10, Figures 1-3. The pin 14 is provided with a pointed end 15 for facilitating the insertion of the pin into the dress or hat. In Figure 4, the holder has secured thereto a conventional U-shaped hair pin 16 so that the flower can be worn in a ladies' hair.

From the foregoing, it is apparent that a holder has been provided which will maintain a flower fresh for a long period of time. In use, the base B of the flower F is seated in the cup 10 and the sponge lining 12 supplies the necessary water for the flower. The pins 13 project through the cup and into engagement with the base B of the flower to maintain the flower immobile therein. Then, the pin 14 or the pin 16 is arranged in engagement with a hat, dress, or ladies' hair to thereby present an extremely attractive flower holder.

The rolled edge 11 serves to strengthen the cup 10, and also acts as a guide for the pins 13. Further, the rolled edge 11 maintains the sponge lining 12 in place in the cup 10 and also prevents any water from dripping out of the cup. The central portion of the sponge lining 12 is preferably of an increased thickness in order to supply sufficient water to the base B of the flower. The front of the cup 10 is opened sufficiently so that all sizes of flowers can be accommodated therein. Also, the pins 13 will support an extremely small flower in the cup, and the pins 13 will not damage the flower. This holder is especially suitable for supporting camelia japonicas since said flower can be readily supported without using any of the valuable wood stems to support the flower. By using this device, flowers will face directly forward and will not hang down or point up, as is usual when the flower stem is pinned onto the article of clothing. The device is also useful in displaying single blooms at flower shows and the like.

What I claim:

A holder for a fresh flower comprising a cup provided with an inturned rolled edge, a moisture-holding sponge lining arranged in said cup, a plurality of headed pins slidably projecting through said cup and through said rolled edge and adapted to pierce the base of the flower, said pins being arranged in the same plane, and a pin secured to the rear of said cup.

GEORGE STROMER.

REFERENCES CITED

The following references are of record in the file of this patent:

UNITED STATES PATENTS

| Number | Name | Date |
|---|---|---|
| 670,097 | Braunger | Mar. 19, 1901 |
| 809,172 | Burdick | Jan. 2, 1906 |
| 1,851,205 | Nagai | Mar. 29, 1932 |